US010615725B2

(12) United States Patent
Miyaji et al.

(10) Patent No.: US 10,615,725 B2
(45) Date of Patent: Apr. 7, 2020

(54) MOTOR CONTROL DEVICE AND STEP-OUT STATE DETECTION METHOD

(71) Applicant: MINEBEA MITSUMI Inc., Nagano (JP)

(72) Inventors: Shigeki Miyaji, Hamamatsu (JP); Hidetoshi Hijikata, Hamamatsu (JP); Kazuo Takada, Kosai (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/281,226

(22) Filed: Feb. 21, 2019

(65) Prior Publication Data
US 2019/0190417 A1 Jun. 20, 2019

Related U.S. Application Data

(63) Continuation of application No. PCT/JP2017/027804, filed on Aug. 1, 2017.

(30) Foreign Application Priority Data

Aug. 31, 2016 (JP) .................................. 2016-168879

(51) Int. Cl.
H02P 8/38 (2006.01)
H02P 8/12 (2006.01)
H02P 8/20 (2006.01)

(52) U.S. Cl.
CPC .................. H02P 8/38 (2013.01); H02P 8/12 (2013.01); H02P 8/20 (2013.01)

(58) Field of Classification Search
None
See application file for complete search history.

(56) References Cited

U.S. PATENT DOCUMENTS 5,625,269 A * 4/1997 Ikeda ..................... H02P 8/14
318/400.34
6,833,711 B1 * 12/2004 Hou ..................... G01R 31/327
324/508

(Continued)

FOREIGN PATENT DOCUMENTS

JP H10-164894 A 6/1998
JP 2009-261045 A 11/2009

(Continued)

OTHER PUBLICATIONS

International Search Report for corresponding International Application No. PCT/JP2017/027804 dated Oct. 17, 2017.

(Continued)

Primary Examiner — Bentsu Ro
(74) Attorney, Agent, or Firm — Pearne & Gordon LLP

(57) ABSTRACT

In order to prevent erroneous detection of motor step-out even when the rotational speed of the motor crosses a resonance region of the motor under acceleration and/or deceleration, a motor control device (10) includes a control unit for performing control so as to apply a pulse voltage modulated in pulse width to each of coils of plural phases equipped in a motor (20) and periodically switch the phases of the coil currents flowing through the coils of the plural phases, a back electromotive force measuring unit (126) for providing a stop period for temporarily stopping application of the pulse voltage to a coil of any one phase out of the coils of the plural phases when the direction of a coil current flowing through the coil of the phase switches, and measuring back electromotive force induced in the coil during the stop period, and a step-out state detecting unit for detecting a step-out state when the rotational speed of the motor (20) is not in a resonance region of the motor (20) and the back electromotive force measured by the back electromotive (Continued)

force measuring unit (126) satisfies a predetermined step-out state determination criterion.

6 Claims, 8 Drawing Sheets

(56) References Cited

U.S. PATENT DOCUMENTS

| | | | |
|---|---|---|---|
| 2005/0024007 A1* | 2/2005 | Coutu | H02P 8/12 |
| | | | 318/685 |
| 2006/0152866 A1* | 7/2006 | Benmouyal | H02H 3/402 |
| | | | 361/42 |
| 2009/0256515 A1 | 10/2009 | Takada et al. | |
| 2012/0001584 A1 | 1/2012 | Takada et al. | |
| 2014/0239874 A1 | 8/2014 | Inoue | |
| 2017/0366123 A1* | 12/2017 | Saw | H02P 6/182 |

FOREIGN PATENT DOCUMENTS

| | | |
|---|---|---|
| JP | 2012-010460 A | 1/2012 |
| JP | 2012-016221 A | 1/2012 |
| JP | 2013-031294 A | 2/2013 |
| JP | 2014-168326 A | 9/2014 |

OTHER PUBLICATIONS

Written Opinion for corresponding International Application No. PCT/JP2017/027804 dated Oct. 17, 2017.
Japanese Office Action for Application No. 2016-168879, dated May 7, 2019.
English translation of Written Opinion for corresponding International Application No. PCT/JP2017/027804 dated Oct. 17, 2017.
International Preliminary Report on Patentability for corresponding International Application No. PCT/JP2017/027804 dated Mar. 5, 2019.

* cited by examiner

| ACCELERATION REGION | ROTATIONAL SPEED AT ACCELERATION START TIME | BACK ELECTROMOTIVE FORCE VALUE FOR DETECTION OF STEP-OUT |
|---|---|---|
| V0 → V1 | V0 | Vol_0 |
| V1 → V2 | V1 | Vol_1 |
| V2 → V3 | V2 | Vol_2 |
| V3 → V4 | V3 | Vol_3 |
| V4 → V5 | V4 | ---- |
| V5 → V6 | V5 | Vol_5 |
| V6 → V7 | V6 | Vol_6 |
| V7 → V_target | V7 | Vol_7 |
| V_target | V8 | Vol_8 |

| DECELERATION REGION | ROTATIONAL SPEED AT DECELERATION START TIME | BACK ELECTROMOTIVE FORCE VALUE FOR DETECTION OF STEP-OUT |
|---|---|---|
| V_target → V7 | V8 | Vol_7 |
| V7 → V6 | V7 | Vol_6 |
| V6 → V5 | V6 | Vol_5 |
| V5 → V4 | V5 | --- |
| V4 → V3 | V4 | Vol_3 |
| V3 → V2 | V3 | Vol_2 |
| V2 → V1 | V2 | Vol_1 |
| V1 → V0 | V1 | Vol_0 |
| V0 | V0 | Vol_0 |

MOTOR CONTROL DEVICE AND STEP-OUT STATE DETECTION METHOD

CROSS REFERENCE TO RELATED APPLICATIONS

The present application is a continuation application of International Patent Application No. PCT/JP2017/027804 filed on Aug. 1, 2017, which claims the benefit of Japanese Patent Application No. 2016-168879, filed on Aug. 31, 2016. The contents of these applications are incorporated herein by reference in their entirety.

BACKGROUND

Technical Field

The present disclosure relates to a motor control device for a stepping motor and a step-out state detection method.

Background

It has been conventionally disclosed that whether step-out has occurred is determined based on a timing signal indicating a phase of current for driving a motor as a motor control device (for example, Japanese Patent Application Laid-Open No. 2012-10460).

In the abstract of Japanese Patent Application Laid-Open No. 2012-10460, it is described that "A motor control device 60 includes a driver 63 for outputting current for driving a stepping motor 70 and outputting a timing signal indicating the phase of the current, a calculation unit 65 for calculating a difference between a target output time indicating a predetermined time at which the driver 63 outputs the timing signal, and an actually measured output time indicating a time at which the driver 63 outputs the timing signal, and a determination unit 66 for determining whether the difference calculated by the calculation unit 65 is equal to or more than a predetermined threshold value, and determining that step-out has occurred in the stepping motor 70 when the difference is equal to or more than the predetermined threshold value."

In a control method in which back electromotive force is detected at a zero-cross point of motor current and used for detecting step-out, the back electromotive voltage fluctuates in a resonance (frequency) region. Therefore, when crossing the resonance (frequency) region of the motor under acceleration or deceleration of rotation of the motor, step-out of the motor may be erroneously detected.

The present disclosure is related to providing a motor control device and a step-out state detection method that does not erroneously detect any step-out of a motor under acceleration or deceleration of rotation of the motor even when crossing the resonance (frequency) region.

SUMMARY

A motor control device according to the present disclosure comprises: a control unit for performing control so as to apply a pulse voltage modulated in pulse width to each of the coils of a plurality of phases equipped in a stepping motor and periodically switch phases of coil currents flowing through the coils of the plurality of phases; a back electromotive force measuring unit for providing a stop period for temporarily stopping application of the pulse voltage to a coil of any one phase out of the coils of the plurality of phases when a direction of a coil current flowing through the coil of the phase switches, and measuring back electromotive force induced in the coil during the stop period; and a step-out state detecting unit for detecting a step-out state when a rotational speed of the stepping motor is not in a resonance region of the stepping motor and the back electromotive force measured by the back electromotive force measuring unit satisfies a predetermined step-out state determination criterion.

Other units will be described in an embodiment for implementing the present disclosure.

According to the present disclosure, in a motor control device and a step-out state detection method, step-out of a motor is prevented from being erroneously detected even when the rotational speed of the motor crosses the resonance region of the motor under acceleration and/or deceleration of the rotation of the motor.

DETAILED DESCRIPTION

An embodiment of the present disclosure will be described hereinafter in detail with reference to the drawings.

Figure 1:
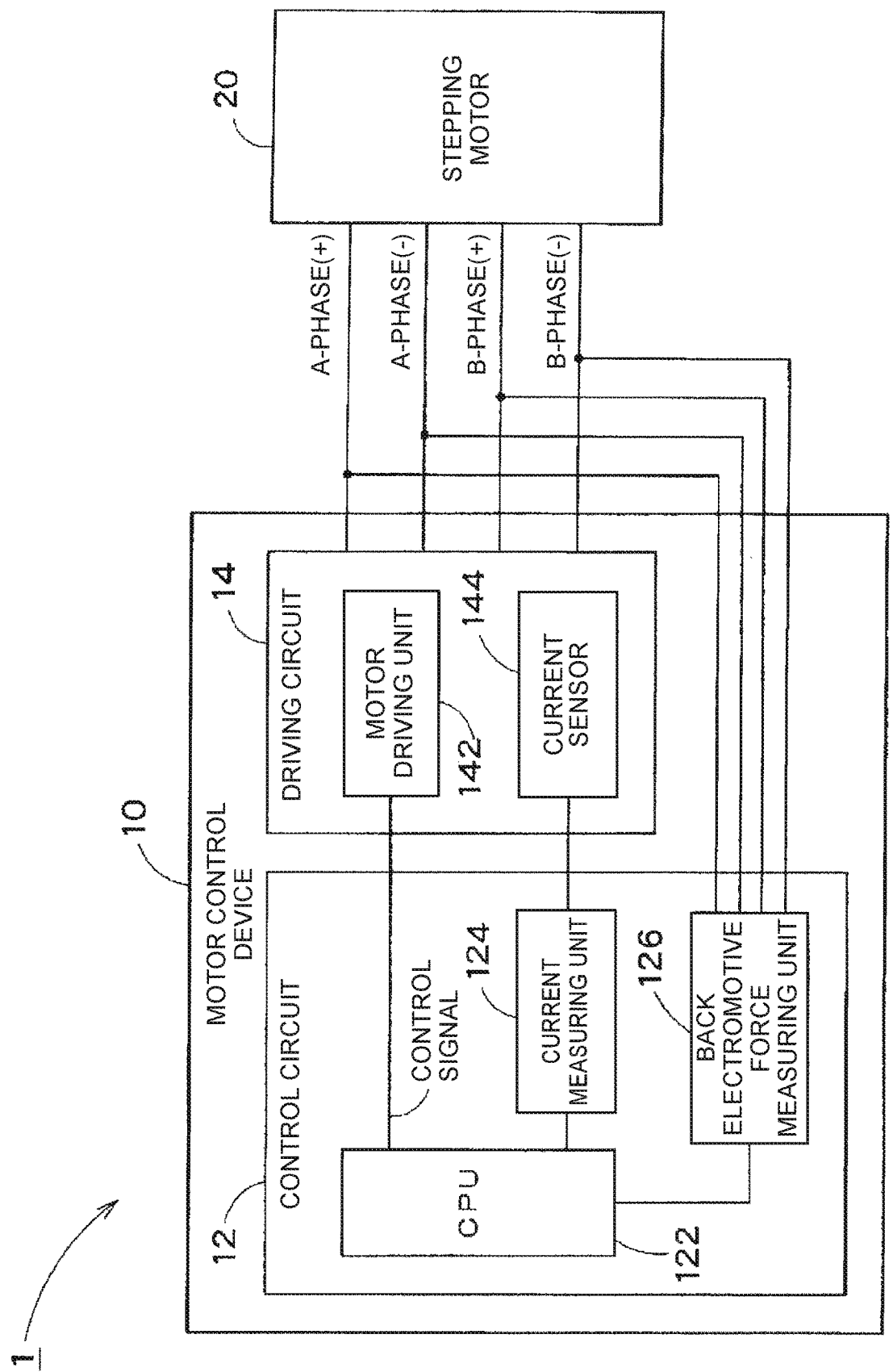
FIG. 1 is a block diagram showing a configuration of a stepping motor system according to an embodiment.

FIG. 1 is a block diagram showing a configuration of a stepping motor system 1 according to an embodiment.

As shown in FIG. 1, the stepping motor system 1 includes a motor control device 10 and a stepping motor (hereinafter simply referred to as a motor) 20. The motor control device 10 is a module for controlling the motor 20. The motor 20 is a two-phase stepping motor driven by two-phase excitation of an A-phase and a B-phase. The motor 20 is driven in a bipolar drive manner, and used as an actuator for an in-vehicle mount type air conditioner, for example.

The motor control device 10 includes a control circuit 12 and a driving circuit 14. The control circuit 12 is a circuit for controlling the driving circuit 14. The control circuit 12 includes a central processing unit (hereinafter referred to as "CPU") 122, a current measuring unit 124, and a back electromotive force measuring unit 126. The driving circuit 14 is a circuit for driving the motor 20. The driving circuit 14 includes a motor driving unit 142 and a current sensor 144.

CPU 122 is a processor for generating a control signal for controlling a voltage to be applied to the motor 20 based on a measurement result (described later) supplied from the current measuring unit 124, and supplying the generated control signal to the motor driving unit 142. CPU 122 stores the setting of a target current under a normal driving operation and a target current during a stop period with respect to currents that flow through coils of respective phases.

The current measuring unit 124 is a module for measuring current flowing through the coil of each phase of the motor 20 (hereinafter referred to as "coil current") based on a current sensing result (described later) supplied from the current sensor 144, and outputting a measurement result to CPU 122.

The back electromotive force measuring unit 126 is a module for measuring back electromotive force induced in the coil of each phase of the motor 20 and supplying the measurement result to CPU 122.

The motor driving unit 142 is a module for applying a voltage to the coil of each phase of the motor 20 based on a control signal supplied from CPU 122.

The current sensor 144 is a module for sensing the coil current of the motor 20 and supplying a current sensing result to the current measuring unit 124.

Figure 2:
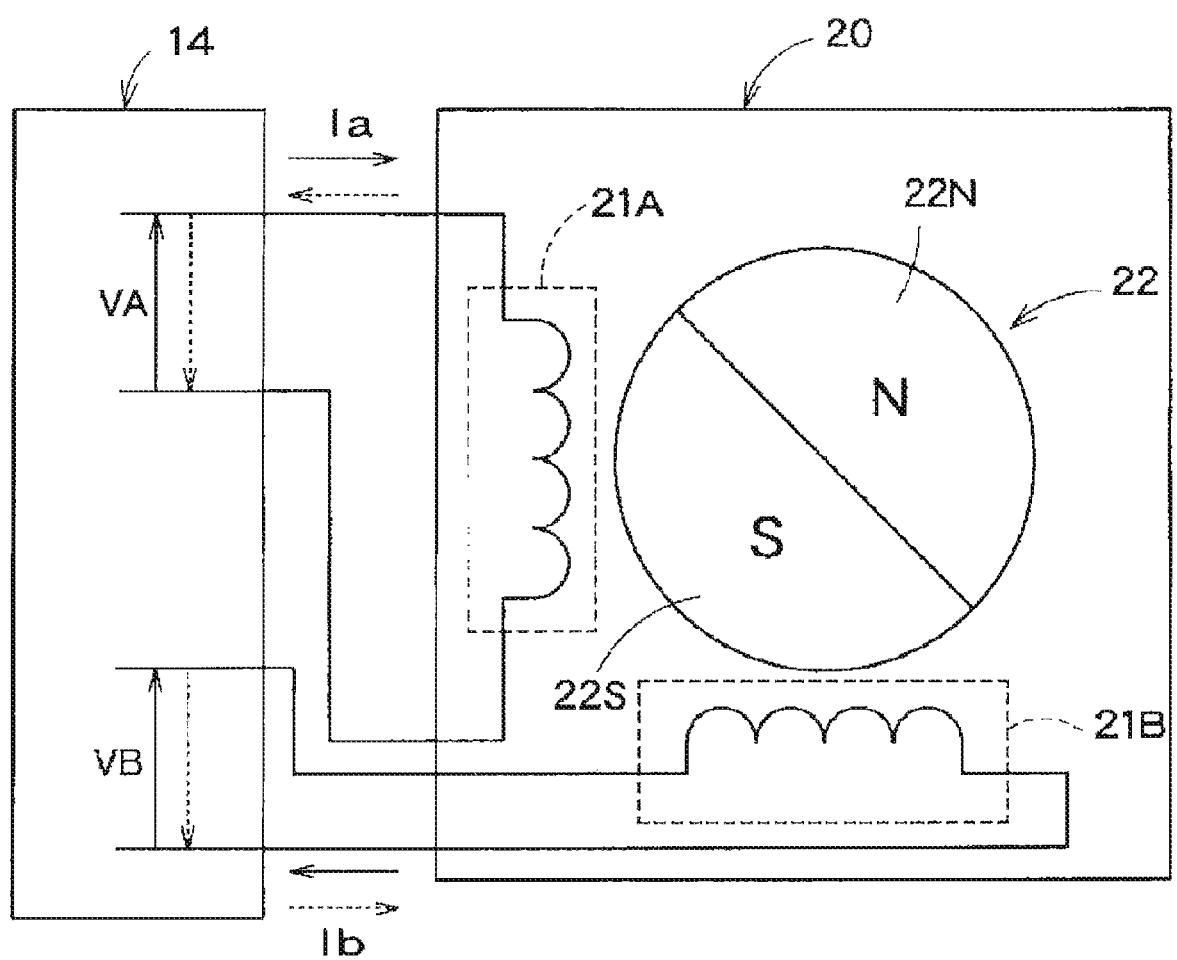
FIG. 2 is a circuit diagram showing a configuration of a stepping motor according to the present embodiment.

FIG. 2 is a circuit diagram showing a configuration of the motor 20 in the present embodiment.

As shown in FIG. 2, the motor 20 includes two coils 21A and 21B, a rotor 22, and plural stator yokes (not shown).

The coil 21A is an A-phase coil. The coil 21B is a B-phase coil. Each of the coils 21A and 21B excites the stator yoke (not shown). Each of the coils 21A and 21B is connected to the driving circuit 14. Different coil voltages VA and VB are applied to the coils 21A and 21B, respectively, and coil currents Ia and Ib having different phases flow through the coils 21A and 21B, respectively.

The rotor 22 includes a permanent magnet which has been subjected to multipolar magnetization so that an S-pole 22S and an N-pole 22N are alternately reversed along a peripheral direction. The rotor 22 is rotated by periodically switching the phases of coil currents Ia and Ib flowing through the coils 21A and 21B of the respective phases.

The coil current Ia flowing through the coil 21A switches in polarity, that is, from a direction indicated by a solid-line arrow to a direction indicated by a broken-line arrow at a predetermined period. The coil current Ib flowing through the coil 21B switches in polarity, that is, from a direction indicated by a solid-line arrow to a direction indicated by a broken-line arrow at a predetermined period.

A coil voltage VA applied to the coil 21A is a pulse voltage which has been subjected to pulse width modulation, and switches in polarity, that is, from a direction indicated by a solid-line arrow to a direction indicated by a broken-line arrow at a predetermined period. When the coil voltage VA is applied in the direction indicated by the solid-line arrow, the coil current Ia flows in the direction indicated by the solid-line arrow. When the coil voltage VA is applied in the direction indicated by the broken-line arrow, the coil current Ia flows in the direction indicated by the broken-line arrow. The voltage VB is in the same manner as the voltage VA.

CPU 122 of the control circuit 12 and the motor driving unit 142 of the driving circuit 14 (see FIG. 1) operate as control units for applying, to each of the coils 21A and 21B of the motor 20, pulse voltages which have been subjected to pulse width modulation, and performing control so that the phases of the coil currents flowing through the coils of plural phases are periodically switched. Hereinafter, CPU 122 and the motor driving unit 142 may be collectively referred to as "control unit" in some cases.

When the direction of the coil current flowing through a coil of any one phase (the coil 21A or 21B) switches, application of the pulse voltage to this coil is stopped. Hereinafter, a period during which the application of the pulse voltage to the coil is stopped may be referred to as "stop period" in some cases.

During the stop period in which the direction of the coil current flowing through the coil of any one phase (the coil 21 A or 21 B) switches, the back electromotive force measuring unit 126 (see FIG. 1) measures back electromotive force induced in this coil.

CPU 122 compares the back electromotive force measured by the back electromotive force measuring unit 126 with a threshold value to detect step-out. When the back electromotive force becomes smaller than the threshold value, CPU 122 detects that the motor 20 has stepped out. The back electromotive force will be described in detail with reference to FIG. 4 described later. CPU 122 functions as a step-out state detecting unit that detects a step-out state when the back electromotive force measured by the back electromotive force measuring unit 126 satisfies a predetermined step-out state determination criterion.

Figure 3:
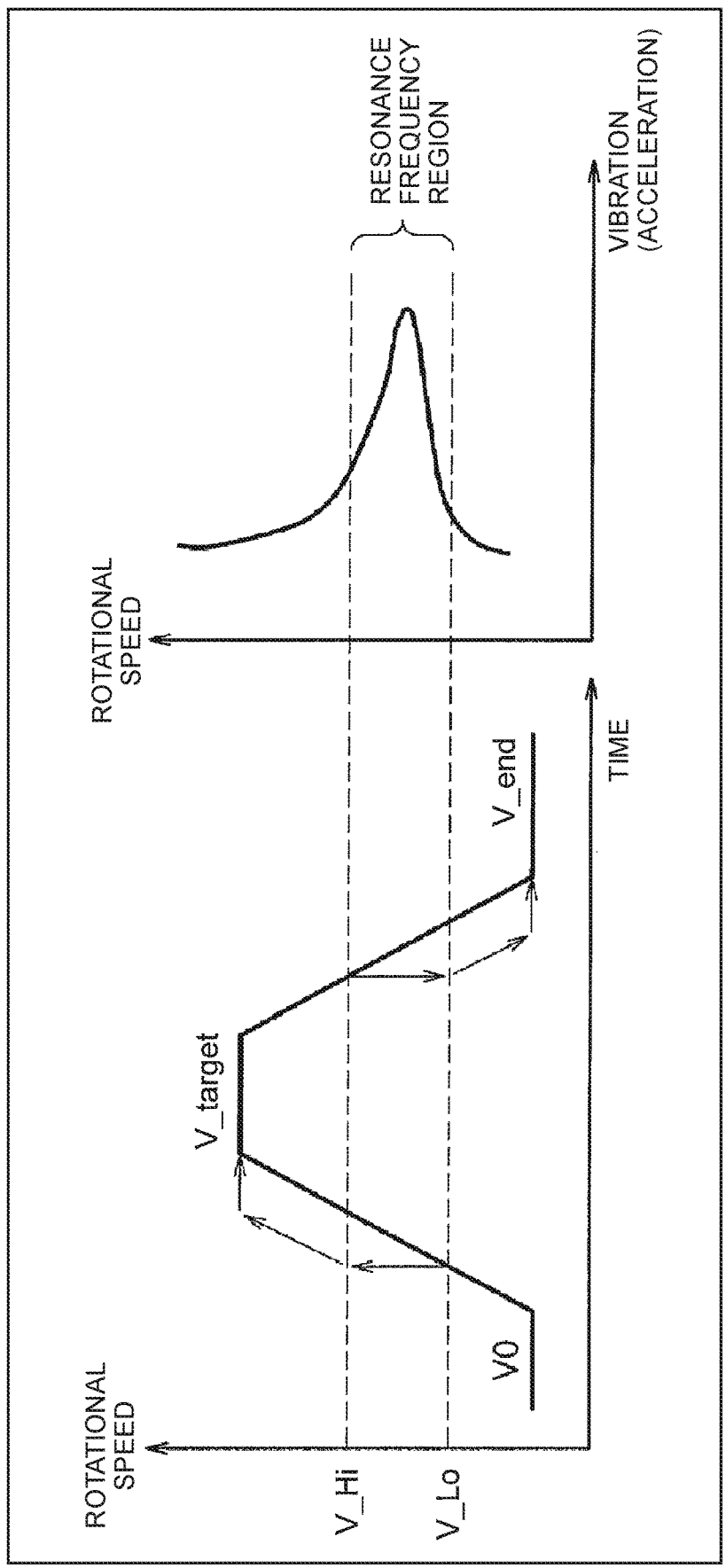
FIG. 3 is a diagram showing a concept of a rotational speed control method according to the present embodiment.

FIG. 3 is a diagram showing the concept of a rotational speed control method according to the present embodiment.

The motor control device 10 of the present embodiment performs constant current control on the motor 20, detects back electromotive force at a zero cross point of the motor current, and uses the detected back electromotive force for detection of step-out. Furthermore, the motor control device 10 sets an optimum threshold value (back electromotive force value) for detection of step-out in accordance with the rotational speed. The ordinate axis of a graph (a) of FIG. 3 represents the rotational speed, and the abscissa axis of the graph (a) of FIG. 3 represents the time. The ordinate axis of a graph (b) of FIG. 3 represents the common rotational speed, and the abscissa axis represents vibration (acceleration).

In the graph (a) of FIG. 3, the motor control device 10 rotates the motor 20 at a rotational speed V0, and then accelerates the motor 20 to a target rotational speed V_target. Thereafter, the motor control device 10 decelerates the motor 20 to a final rotational speed V_end.

When the motor 20 is controlled under the foregoing preconditions, the back electromotive force fluctuates in a resonance region (resonance frequency region) shown in the graph (b) of FIG. 3, which may cause erroneous detection of step-out. In the resonance region, the control unit of the present embodiment performs control so as to promptly change the rotational speed of the motor 20. In the graph (a) of FIG. 3, the range between a lower limit rotational speed V_Lo and an upper limit rotational speed V_Hi corresponds to the resonance region.

When the rotational speed of the motor 20 has reached the lower limit rotational speed V_Lo of the resonance region under acceleration of the rotation of the motor 20, the control unit performs control so as to promptly change the rotational speed to the upper limit rotational speed V_Hi so that the rotational speed is equal to a rotational speed far exceeding the resonance region. Furthermore, when the rotational speed of the motor 20 has reached the upper limit rotational speed V_Hi of the resonance region under deceleration of the rotation of the motor 20, the control unit performs control so as to promptly change the rotational speed to the lower limit rotational speed V_Lo so that the rotational speed is equal to a rotational speed far exceeding the resonance region.

Also, as shown in the graph (b) of FIG. 3, the vibration (acceleration) increases in the resonance region as compared with other regions. The control unit can quickly suppress the vibration of the motor 20 by changing the rotational speed of the motor 20 while avoiding the resonance region under the acceleration and deceleration of rotation of the motor 20.

Figure 4:
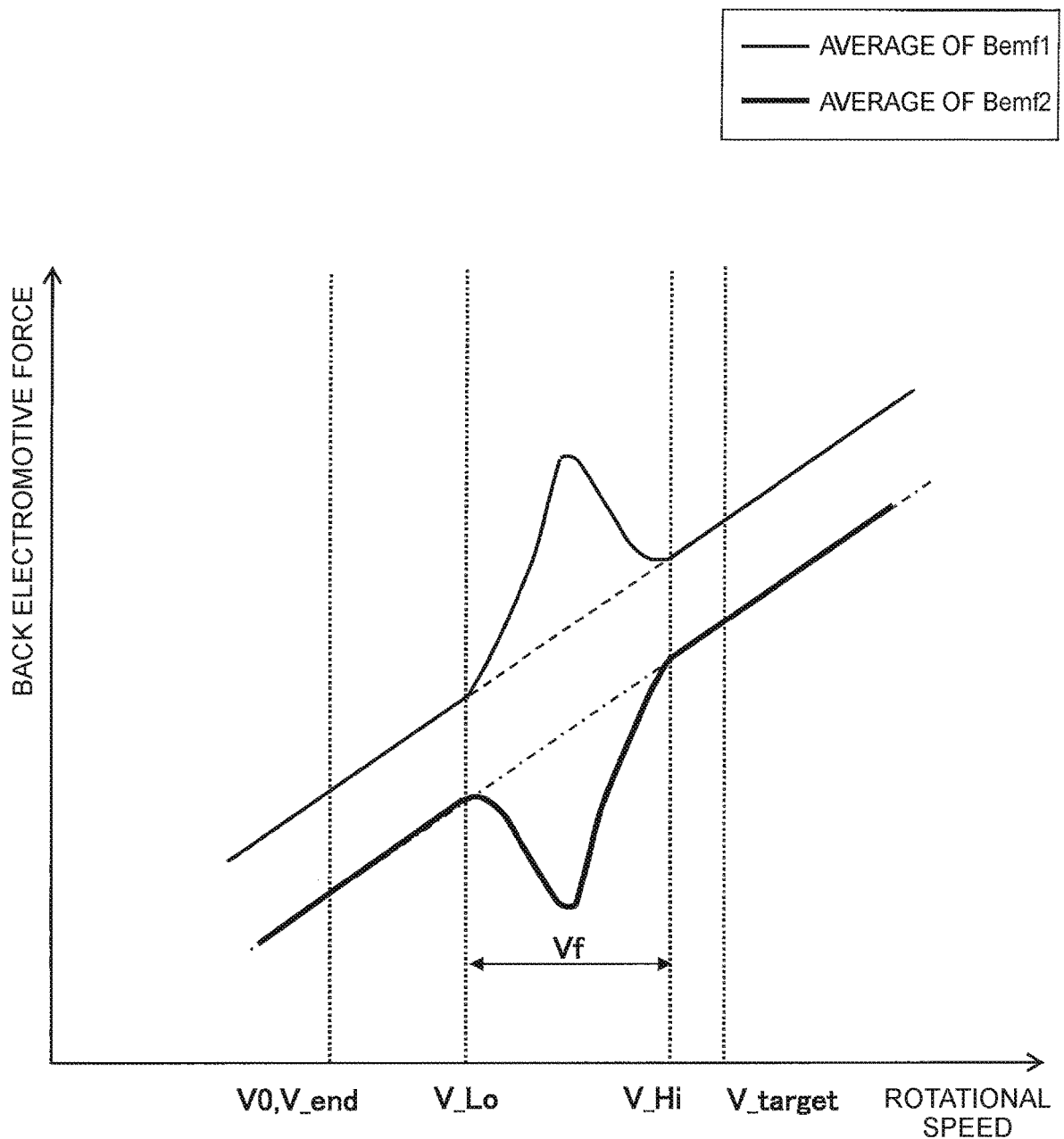
FIG. 4 is a graph showing a relationship between a rotational speed and back electromotive force.

FIG. 4 shows an example of a graph showing the relationship between the rotational speed and the back electromotive force, which is simulated.

The ordinate axis of the graph represents the back electromotive force, and the abscissa axis represents the rotational speed. A rotational speed V0 indicates an initial speed under acceleration, and a target rotational speed V_target indicates a final target speed under acceleration of the rotation of the motor 20. When the acceleration is completed, the motor 20 rotates at the target rotational speed V_target.

The target rotational speed V_target is also an initial speed under deceleration, and a final rotational speed V_end is a final target speed under deceleration and is also equal to the rotational speed V0. When the deceleration is completed, the motor 20 rotates at the final rotational speed V_end.

A thin solid line of the graph represents an average value of back electromotive force Bemf1 of the coil 21A. A bold solid line on the graph represents an average value of back electromotive force Bemf2 of the coil 21B.

The back electromotive force Bemf1 increases linearly from the rotational speed V0 to the lower limit rotational speed V_Lo, increases from the lower limit rotational speed V_Lo to the upper limit rotational speed V_Hi after deviating from the linear relationship, and then increases linearly again from the upper limit rotational speed V_Hi to the target rotational speed V_target. The back electromotive force Bemf2 linearly increases from the rotational speed V0 to the lower limit rotational speed V_Lo, decreases from the lower limit rotational speed V_Lo to the upper limit rotational speed V_Hi after deviating from the linear relationship, and then increases linearly again from the upper limit rotational speed V_Hi to the target rotational speed V_target. Here, a rotational speed range Vf represents the resonance region.

In the rotational speed range Vf, both of the back electromotive force Bemf1 and the back electromotive force Bemf2 deviate from the linear relationship. Therefore, CPU 122 cannot correctly detect the step-out of the motor 20. Therefore, the control unit of the present embodiment performs control so as not to determine the step-out in the rotational speed range Vf.

Figures 5, 6:
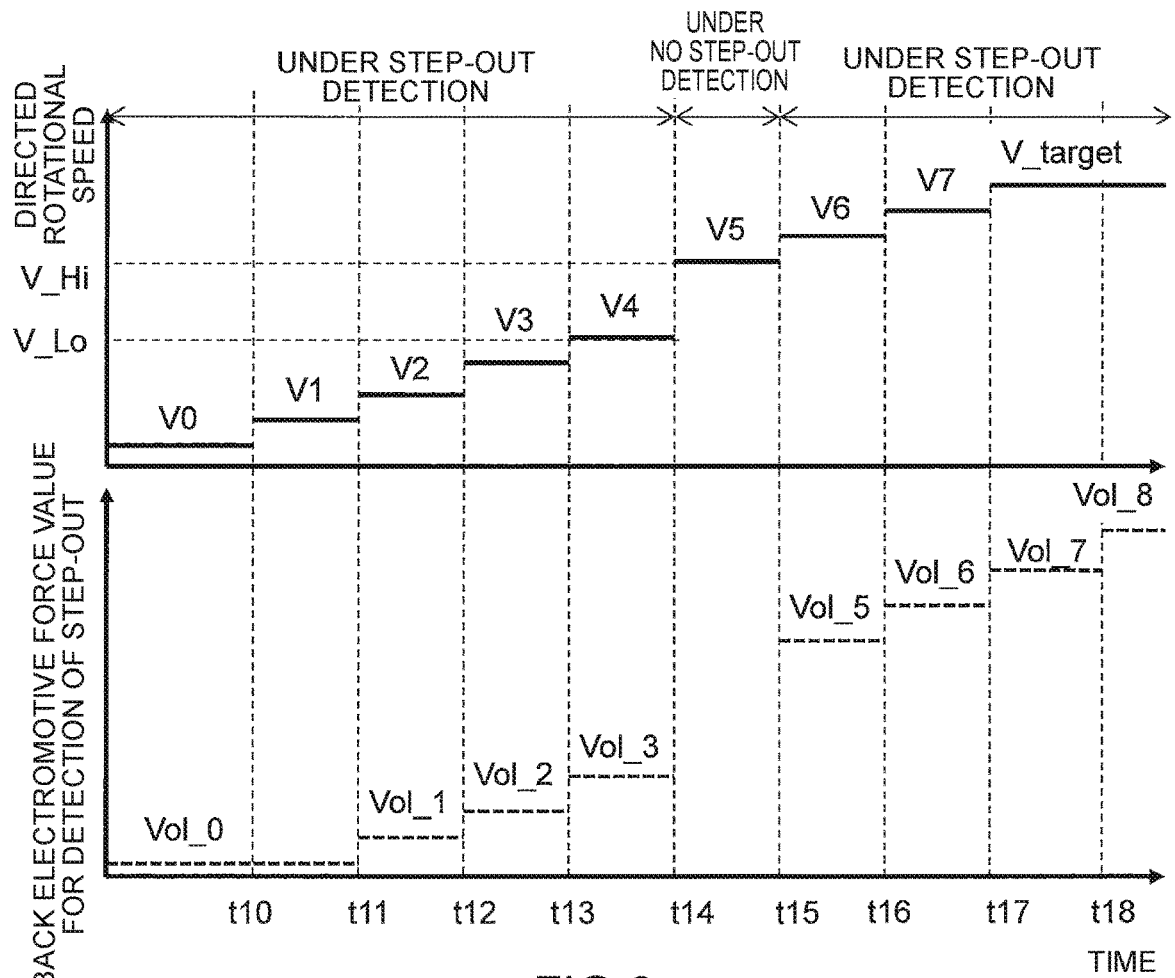
FIG. 5 is a diagram showing a back electromotive force value table for detection of step-out under acceleration
FIG. 6 is a diagram showing a specific example of rotational speed control under acceleration.

FIG. 5 is a diagram showing a back electromotive force value table for detection of step-out under acceleration of the rotation of the motor 20.

This back electromotive force value table for detection of step-out includes an acceleration region item, a datum indicating the rotational speed at the start time of acceleration, and a datum indicating the back electromotive force value for detection of step-out.

In an acceleration region from the (directed) rotational speed V0 to a (directed) rotational speed V1, the (actual) rotational speed at an acceleration start time is equal to V0, and the back electromotive force value for detection of step-out is equal to Vol_0. Note that the back electromotive force value Vol_0 for detection of step-out is a back electromotive force value for detection of step-out at the (directed) rotational speed V0.

In an acceleration region from the (directed) rotational speed V1 to a (directed) rotational speed V2, the (actual) rotational speed at an acceleration start time is equal to V1, and the back electromotive force value for detection of step-out is equal to Vol_1. Note that the back electromotive force value Vol_1 for detection of step-out is a back electromotive force value for detection of step-out at the (directed) rotational speed V1.

In an acceleration region from the (directed) rotational speed V2 to a (directed) rotational speed V3, the (actual) rotational speed at an acceleration start time is equal to V2, and the back electromotive force value for detection of step-out is equal to Vol_2. Note that the back electromotive force value Vol_2 for detection of step-out is a back electromotive force value for detection of step-out at the (directed) rotational speed V2.

In an acceleration region from the (directed) rotational speed V3 to a (directed) rotational speed V4, the (actual) rotational speed at an acceleration start time is equal to V3, and the back electromotive force value for detection of step-out is equal to Vol_3. Note that the back electromotive force value Vol_3 for detection of step-out is a back electromotive force value for detection of step-out at the (directed) rotational speed V3.

An acceleration region from the (directed) rotational speed V4 to a (directed) rotational speed V5 corresponds to the rotational speed range Vf shown in FIG. 4, and the (actual) rotational speed at an acceleration start time is equal to V4. The (directed) rotational speed V4 corresponds to the lower limit rotational speed V_Lo. The (directed) rotational speed V5 corresponds to the upper limit rotational speed V_Hi. The back electromotive force value for detection of step-out is not defined.

In an acceleration region from the (directed) rotational speed V5 to a (directed) rotational speed V6, the (actual) rotational speed at an acceleration start time is equal to V5, and the back electromotive force value for detection of step-out is equal to Vol_5. Note that the back electromotive force value Vol_5 for detection of step-out is a back electromotive force value for detection of step-out at the (directed) rotational speed V5.

In an acceleration region from the (directed) rotational speed V6 to a (directed) rotational speed V7, the (actual) rotational speed at an acceleration start time is equal to V6, and the back electromotive force value of detection of step-out is equal to Vol_6. Note that the back electromotive force value Vol_6 for step-out detection is a back electromotive force value for detection of step-out at the (directed) rotational speed V6.

In an acceleration region from the (directed) rotational speed V7 to the target rotational speed V_target, the (actual) rotational speed at an acceleration start time is equal to V7, and the back electromotive force value for detection of step-out is equal to Vol_7. Note that the back electromotive force value Vol_7 for detection of step-out is a back electromotive force value for detection of step-out at the (directed) rotational speed V7.

In a steady region of the target rotational speed V_target, the (directed) rotational speed is V8=V_target, and the back electromotive force value for detection of step out is equal to Vol_8. Note that the back electromotive force Vol_8 for detection of step-out is a back electromotive force value for detection of step-out at the (directed) rotational speed V 8=V_target.

In this case, the step-out is detected by using the back electromotive force value for detection of step-out at the acceleration start time during acceleration. Since the (actual) rotational speed at the acceleration start time is lower than the (actual) rotational speed at an acceleration termination time, it is also referred to as a low speed side.

In the stepping motor control method in which the constant current control is performed on the stepping motor to detect the back electromotive force at the zero cross point of the motor current and the detected back electromotive force is used for detection of step-out, the step-out detecting function is set to OFF to prevent erroneous detection of step-out during acceleration and/or deceleration. In the present embodiment, step-out is detected even during acceleration and/or deceleration when the rotational speed of the motor is not in the resonance region.

The back electromotive force has a proportional relationship with the rotational speed of the motor, and thus it is necessary to set an optimum threshold value for each rotational speed in order to correctly detect step-out. However, when a value higher than the optimum threshold value is set, a step-out detection error occurs. Also, when a value lower than the optimum threshold value is set, the step-out detection sensitivity deteriorates. In the present embodiment, occurrence of a step-out detection error is prevented by using the back electromotive force value for detection of step-out on the low speed side during acceleration and/or deceleration.

FIG. 6 is a diagram showing a specific example of the rotational speed control under acceleration of the rotation of the motor 20 by the control unit. In a graph on an upper stage, the ordinate axis represents the directed rotational speed of the motor 20, and the abscissa axis represents the time. In a graph on a lower stage, the ordinate axis represents the back electromotive force value for detection of step-out, and the abscissa axis represents the time.

Initially, the motor 20 is rotating at the rotational speed V0, and the back electromotive force value for detection of step-out (threshold value) is equal to Vol_0.

At a time t10, the control unit controls the motor 20 to rotate at the (directed) rotational speed V1. Therefore, the (actual) rotational speed of the motor 20 is accelerated from the (directed) rotational speed V0 to the (directed) rotational speed V1. During acceleration of the rotation of the motor 20, CPU 122 serves as the step-out state detection unit to compare the back electromotive force of the motor 20 and the back electromotive force value Vol_0 for detection of step-out with each other in order to detect step-out.

At a time t11, CPU 122 determines that the (actual) rotation speed of the motor 20 has reached the (directed) rotational speed V1, and controls the motor 20 to rotate at the (directed) rotational speed V2. Therefore, the (actual) rotational speed of the motor 20 is accelerated from the (directed) rotational speed V1 to the (directed) rotational speed V2. During acceleration of the rotation of the motor 20, CPU 122 serves as the step-out state detection unit to compare the back electromotive force of the motor 20 and the back electromotive force value Vol_1 for detection of step-out with each other to detect step-out.

At a time t12, CPU 122 determines that the (actual) rotation speed of the motor 20 has reached the (directed) rotational speed V2, and controls the motor 20 to rotate at the (directed) rotational speed V3. Therefore, the (actual) rotational speed of the motor 20 is accelerated from the (directed) rotational speed V2 to the (directed) rotational speed V3. During acceleration of the rotation of the motor 20, CPU 122 serves as the step-out state detection unit, comparing the back electromotive force of the motor 20 and the back electromotive force value Vol_2 for detection of step-out with each other to detect step-out.

At a time t13, CPU 122 determines that the (actual) rotation speed of the motor 20 has reached the (directed) rotational speed V3, and controls the motor 20 to rotate at the (directed) rotational speed V4. Therefore, the (actual) rotational speed of the motor 20 is accelerated from the (directed) rotational speed V3 to the (directed) rotational speed V4. During acceleration of the rotation of the motor 20, CPU 122 serves as the step-out state detection unit to compare the back electromotive force of the motor 20 and the back electromotive force value Vol_3 for detection of step-out with each other to detect step-out.

At a time t14, CPU 122 determines that the (actual) rotation speed of the motor 20 has reached the (directed) rotational speed V4, and controls the motor 20 so that it rotates at the (directed) rotational speed V5. Therefore, the (actual) rotational speed of the motor 20 is accelerated from the (directed) rotational speed V4 to the (directed) rotational speed V5. During acceleration of the rotation of the motor 20, CPU 122 does not perform the step-out detection.

At a time t15, CPU 122 determines that the (actual) rotation speed of the motor 20 has reached the (directed) rotational speed V5, and controls the motor 20 to rotate at the (directed) rotational speed V6. Therefore, the (actual) rotational speed of the motor 20 is accelerated from the (directed) rotational speed V5 to the (directed) rotational speed V6. During acceleration of the rotation of the motor 20, CPU 122 serves as the step-out state detection unit to compare the back electromotive force of the motor 20 and the back electromotive force value Vol_5 for detection of step-out with each other to detect step-out.

At a time t16, CPU 122 determines that the (actual) rotation speed of the motor 20 has reached the (directed) rotational speed V6, and controls the motor 20 to rotate at the (directed) rotational speed V7. Therefore, the (actual) rotational speed of the motor 20 is accelerated from the (directed) rotational speed V6 to the (directed) rotational speed V7. During acceleration of the rotation of the motor 20, CPU 122 serves as the step-out state detection unit to compare the back electromotive force of the motor 20 and the back electromotive force value Vol_6 for detection of step-out with each other to detect step-out.

At a time t17, CPU 122 determines that the (actual) rotation speed of the motor 20 has reached the (directed) rotational speed V7, changes the switching period of the phase of the coil current and controls the motor 20 to rotate at the target rotational speed V_target. Therefore, the motor 20 is accelerated from the (directed) rotational speed V7 to the target rotational speed V_target. During acceleration of the rotation of the motor 20, CPU 122 serves as the step-out state detection unit to compare the back electromotive force of the motor 20 and the back electromotive force value Vol_7 for detection of step-out with each other to detect step-out.

At a time t18, CPU 122 determines that the (actual) rotation speed of the motor 20 has reached the target rotational speed V_target, and controls the motor 20 to rotate at the target rotational speed V_target afterwards. At this time, CPU 122 serves as the step-out state detection unit to compare the back electromotive force of the motor 20 and the back electromotive force value Vol_8 for detection of step-out with each other to detect step-out.

Figure 7:
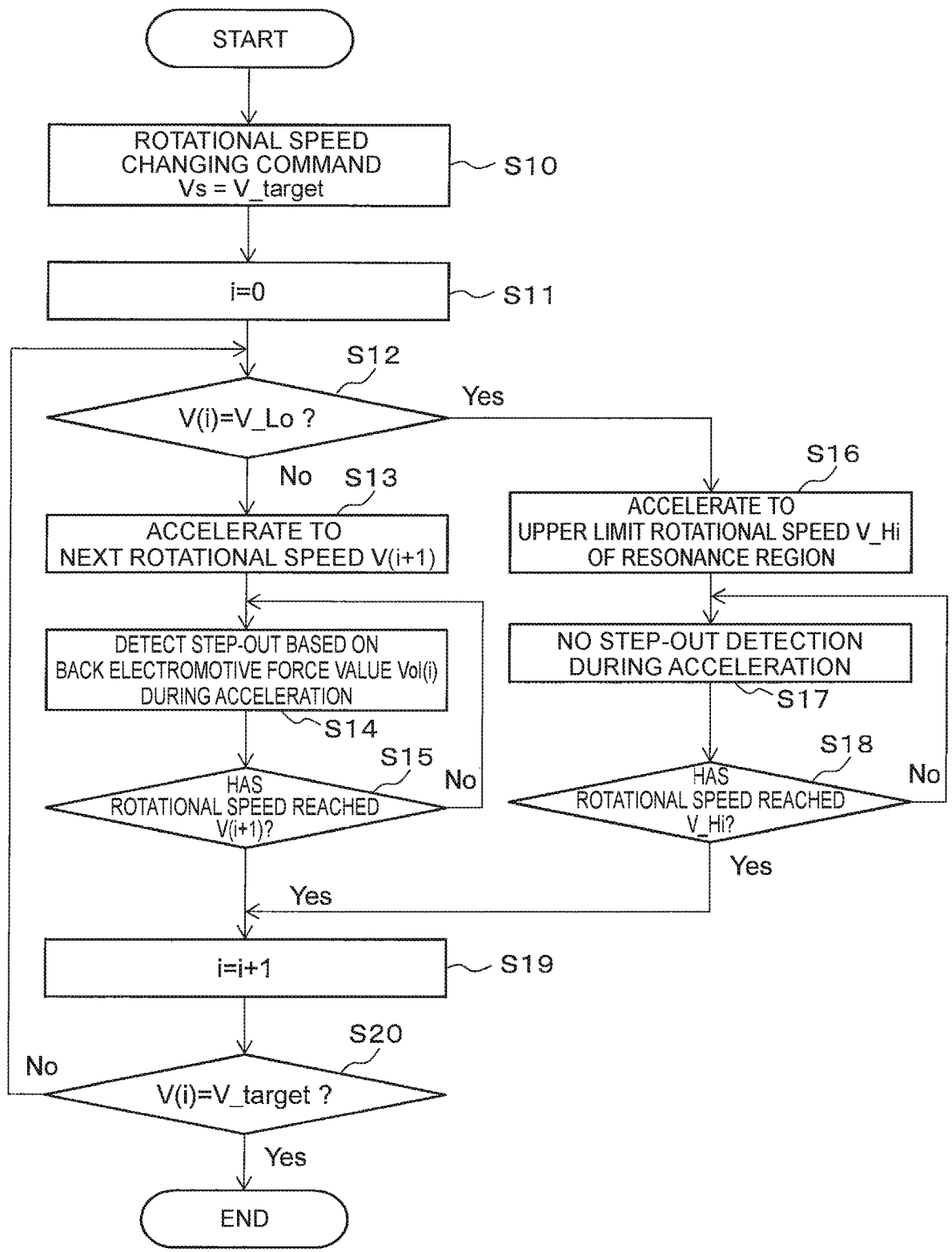
FIG. 7 is a flowchart relating to rotational speed control processing under acceleration.

FIG. 7 is a flowchart relating to rotational speed control processing under acceleration of the rotation of the motor 20 by the control unit.

Initially, the control unit substitutes the target rotational speed V_target into a final directed rotational speed Vs to execute a rotational speed change command (step S10). As a result, the final directed rotational speed Vs of the motor 20 changes from the rotational speed V0 to the target rotational speed V_target. Furthermore, the control unit sets 0 as a variable i (step S11). Hereinafter, the rotational speed at the acceleration start time indicated by the variable i is referred to as a (directed) rotational speed V(i). The (directed) rotational speed V(i) substantially coincides with the actual rotational speed of the motor 20. Also, the back electromotive force value for detection of step-out indicated by the variable i is referred to as a back electromotive force value Vol(i).

Next, CPU 122 determines whether the (directed) rotational speed V(i) at the acceleration start time has reached the lower limit rotational speed V_Lo (=rotational speed V4) (step S12; a resonance region determining step). When the (directed) rotational speed V(i) has not reached the lower limit rotational speed V_Lo (step S12→No), the control unit accelerates the motor 20 to a next (directed) rotational speed V(i+1) (S13; a rotational speed changing step). When the variable i is equal to 0, the next (directed) rotational speed V(i+1) is the (directed) rotational speed V1.

During acceleration of the rotation of the motor 20, CPU 122 serves as the step-out state detection unit to detect step-out based on the back electromotive force value Vol(i) for detection of step-out (step S14; a step-out state detecting step). When the variable i is equal to 0, the back electromotive force value Vol(i) for detection of step-out indicated by the variable i is Vol_0.

CPU 122 detects step-out based on the back electromotive force value Vol(i) for detection of step-out until the (actual) rotational speed of the motor 20 has reached the next (directed) rotational speed V(i+1) (step S15→No) (Step S14). When the (actual) rotational speed of the motor 20 has reached the next (directed) rotational speed V(i+1) (step S15→Yes), CPU 122 adds 1 to the variable i (step S19). As a result, the (directed) rotational speed V(i) coincides with the actual rotational speed of the motor 20.

When the (directed) rotational speed V(i) has not reached the target rotational speed V_target (step S20→No), CPU 122 returns to the processing in step S12 and repeats the processing in steps S13 to S15 and S19 four times. As a result, the value of the variable i is equal to 4.

When the value of the variable i is equal to 4 in step S12, the (directed) rotational speed V(i) is equal to the lower limit rotational speed V_Lo (step S12→Yes). At this time, the control unit accelerates the (directed) rotation speed of the motor 20 to the upper limit rotational speed V_Hi of the resonance region (step S16; a rotational speed changing step), and does not detect step-out during acceleration until the rotational speed has reached the upper limit rotational speed V_Hi (step S18→No; a resonance region determining step) (step S17).

When the (directed) rotational speed of the motor 20 has reached the upper limit rotational speed V_Hi, CPU 122 proceeds to the processing of step S19 (step S18→Yes: a resonance region determining step).

Subsequently, the control unit repeats the processing of steps S13 to S15 and S19 three times to accelerate the rotation of the motor 20, and then when the (directed) rotational speed has reached the target rotational speed V_target (step S20→Yes), the control unit finishes the processing of FIG. 7 because the rotational speed has reached the final directed rotational speed Vs.

Figures 8, 9:
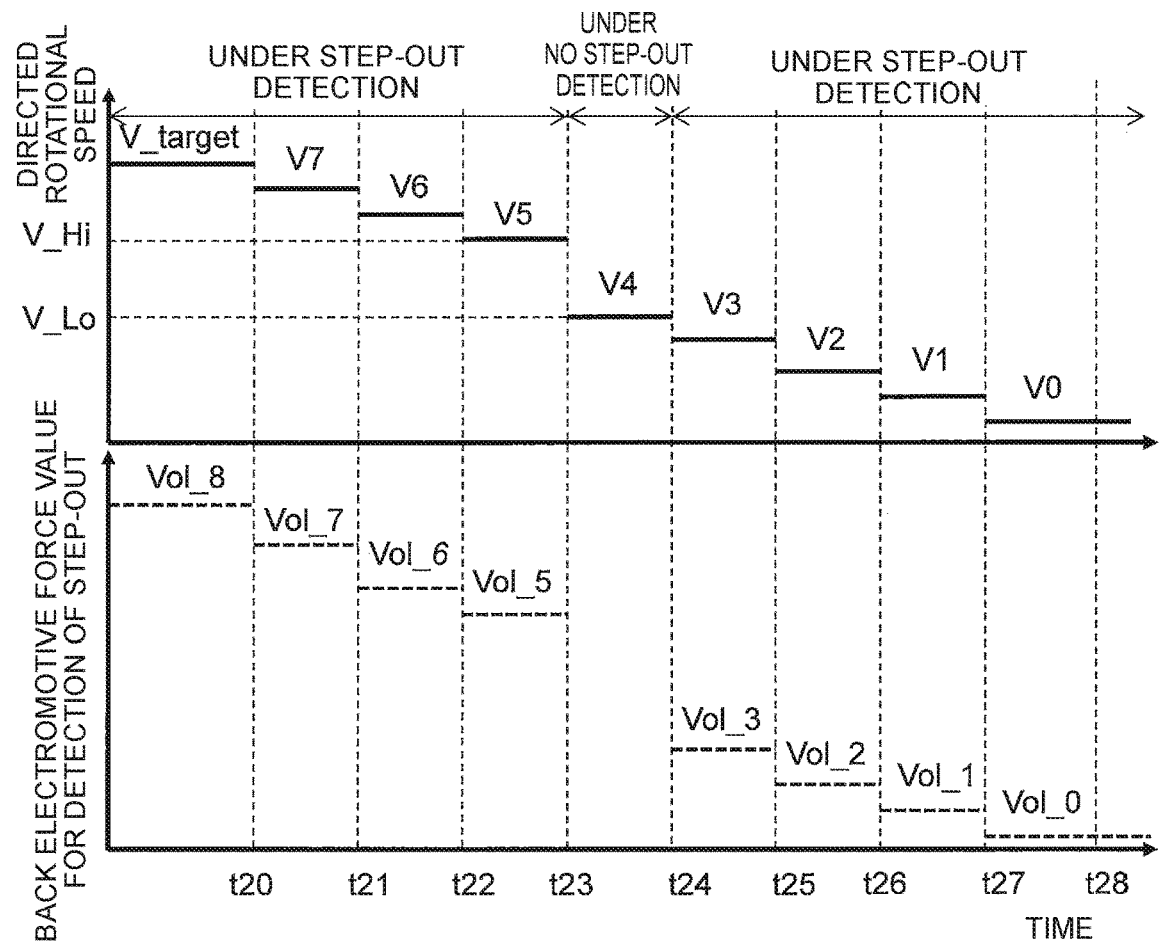
FIG. 8 is a diagram showing a back electromotive force value table for detection of step-out under deceleration.
FIG. 9 is a diagram showing a specific example of rotational speed control under deceleration.

FIG. 8 is a diagram showing a back electromotive force value table for detection of step-out under deceleration of the rotation of the motor 20.

This back electromotive force value table for detection of step-out includes a deceleration region item, an item of the rotational speed at a deceleration start time, and an item of the back electromotive force value for detection of step-out.

In a deceleration region from the target rotational speed V_target to the (directed) rotation speed V7, the (directed) rotational speed V8 at the deceleration start time is equal to V_target, and the back electromotive force value for detection of step-out is equal to Vol_7.

In a deceleration region from the (directed) rotational speed V7 to (directed) rotational speed V6, the (actual) rotational speed at a deceleration start time is equal to V7, and the back electromotive force value for detection of step-out is equal to Vol_6.

In a deceleration region from the (directed) rotational speed V6 to (directed) rotational speed V5, the (actual) rotational speed at a deceleration start time is equal to V6, and the back electromotive force value for detection of step-out is equal to Vol_5.

A deceleration region from the (directed) rotational speed V5 to the (directed) rotational speed V4 corresponds to the rotational speed range Vf shown in FIG. 4, and the (actual) rotational speed at a deceleration start time is equal to V5. The (directed) rotational speed V5 corresponds to the upper limit rotational speed V_Hi. The (directed) rotational speed V4 corresponds to the lower limit rotational speed V_Lo. The back electromotive force value for detection of step-out is not defined.

In a deceleration region from the (directed) rotational speed V4 to the (directed) rotational speed V3, the (actual) rotational speed at a deceleration start time is equal to V4, and the back electromotive force value for detection of step-out is equal to Vol_3.

In a deceleration region from the (directed) rotational speed V3 to the (directed) rotational speed V2, the (actual) rotational speed at a deceleration start time is equal to V3, and the back electromotive force value for detection of step-out is equal to Vol_2.

In a deceleration region from the (directed) rotational speed V2 to the (directed) rotational speed V1, the (actual) rotational speed at a deceleration start time is equal to V2, and the back electromotive force value for detection of step-out is equal to Vol_1.

In a deceleration region from the (directed) rotational speed V1 to the (directed) rotational speed V0, the (actual) rotational speed at a deceleration start time is equal to V1, and the back electromotive force value for detection of step-out is equal to Vol_0.

In a steady region of the (directed) rotational speed V0, the (actual) rotational speed is equal to V0, and the back electromotive force value for detection of step-out is equal to Vol_0.

FIG. 9 is a diagram showing a specific example of the rotational speed control under deceleration of the rotation of the motor 20 by the control unit. In a graph on an upper stage, the ordinate axis represents the directed rotational speed of the motor 20, and the abscissa axis represents the time. In a graph on a lower stage, the ordinate axis represents the back electromotive force value for detection of step-out, and the abscissa axis represents the time.

Initially, the motor 20 has the target rotational speed V_target=the (directed) rotational speed V8, and the back electromotive force value for detection of step-out is equal to Vol_8.

At a time t20, the control unit controls the motor 20 to rotate at the (directed) rotational speed V7. Therefore, the motor 20 decelerates from the target rotational speed V_target to the (directed) rotational speed V7. CPU 122 serves as the step-out state detection unit to compare the back electromotive force of the motor 20 and the back electromotive force value Vol_7 for detection of step-out with each other during deceleration of the rotation of the motor 20 to step-out.

At a time t21, CPU 122 determines that the (actual) rotational speed of the motor 20 has reached the (directed) rotational speed V7 and controls the motor 20 to rotate at the (directed) rotational speed V6. Therefore, the (actual) rotational speed of the motor 20 is decelerated from the (directed) rotational speed V7 to the (directed) rotational speed V6. During deceleration of the rotation of the motor 20, CPU 122 serves as the step-out state detection unit to compare the back electromotive force of the motor 20 and the back electromotive force value Vol_6 for detection of step-out with each other to detect step-out.

At a time t22, CPU 122 determines that the (actual) rotational speed of the motor 20 has reached the (directed) rotational speed V6, and controls the motor 20 to rotate at the (directed) rotational speed V5. Therefore, the (actual) rotational speed of the motor 20 is decelerated from the (directed) rotational speed V6 to the (directed) rotational speed V5. During deceleration of the rotation of the motor 20, CPU 122 serves as the step-out state detection unit to compare the back electromotive force of the motor 20 and the back electromotive force value Vol_5 for detection of step-out in order to detect step-out.

At a time t23, CPU 122 determines that the (actual) rotational speed of the motor 20 has reached the (directed) rotational speed V5, and controls the motor 20 to rotate at the (directed) rotational speed V4. Therefore, the (actual) rotational speed of the motor 20 is decelerated from the (directed) rotational speed V5 to the (directed) rotational speed V4. During deceleration of the rotation of the motor 20, CPU 122 does not perform the step-out detection.

At a time t24, CPU 122 determines that the (actual) rotational speed of the motor 20 has reached the (directed) rotational speed V4, and controls the motor 20 to rotate at the (directed) rotational speed V3. Therefore, the (actual) rotational speed of the motor 20 is decelerated from the (directed) rotational speed V4 to the (directed) rotational speed V3. During deceleration of the rotation of the motor 20, CPU 122 serves as the step-out state detection unit to compare the back electromotive force of the motor 20 and the back electromotive force value Vol_3 for detection of step-out with each other to detect step-out.

At a time t25, CPU 122 determines that the (actual) rotational speed of the motor 20 has reached the (directed) rotational speed V3, and controls the motor 20 to rotate at the (directed) rotational speed V2. Therefore, the (actual) rotational speed of the motor 20 is decelerated from the (directed) rotational speed V3 to the (directed) rotational speed V2. During deceleration of the rotation of the motor 20, CPU 122 serves as the step-out state detection unit to compare the back electromotive force of the motor 20 and the back electromotive force value Vol_2 for detection of step-out with each other to detect step-out.

At a time t26, CPU 122 determines that the (actual) rotational speed of the motor 20 has reached the (directed) rotational speed V2, and controls the motor 20 to rotate at the (directed) rotational speed V1. Therefore, the (actual) rotational speed of the motor 20 is decelerated from the (directed) rotational speed V2 to the (directed) rotational speed V1. During deceleration of the rotation of the motor 20, CPU 122 serves as the step-out state detection unit to compare the back electromotive force of the motor 20 and the back electromotive force value Vol_1 for detection of step-out with each other to detect step-out.

At a time t27, CPU 122 determines that the (actual) rotational speed of the motor 20 has reached the (directed) rotational speed V1, changes the switching period of the phase of the coil current and controls the motor 20 to rotate at the rotational speed V0. Therefore, the (actual) rotational speed of the motor 20 is decelerated from the (directed) rotational speed V1 to the (directed) rotational speed V0. During deceleration of the rotation of the motor 20, CPU 122 serves as the step-out state detection unit to compare the back electromotive force of the motor 20 and the back electromotive force value Vol_0 for detection of step-out with each other to detect step-out.

At a time t28, CPU 122 determines that the (actual) rotational speed of the motor 20 has reached the (directed) rotational speed V0(V_end), and controls the motor 20 to rotate at the (directed) rotational speed V0 afterwards. At this time, CPU 122 compares the back electromotive force of the motor 20 and the back electromotive force value Vol_0 for detection of step-out in order to detect step-out.

Figure 10:
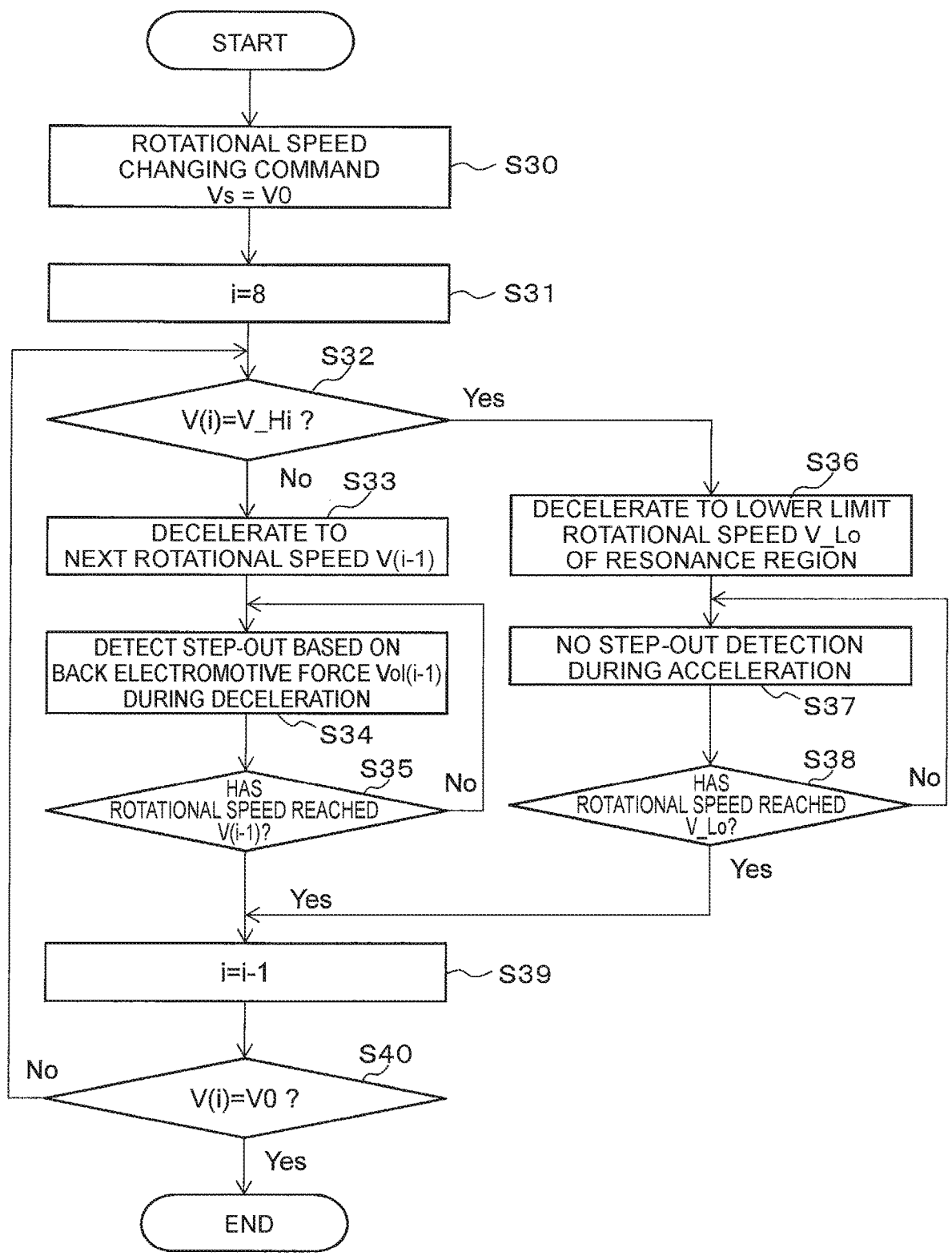
FIG. 10 is a flowchart relating to rotational speed control processing under deceleration.

FIG. 10 is a flowchart relating to the rotational speed control processing under deceleration of the rotation of the motor 20 by the control unit.

Initially, the control unit substitutes the rotational speed V0 into the final directed rotational speed Vs, and executes the rotational speed change command (step S30). As a result, the final directed rotational speed Vs of the motor 20 changes from the target rotational speed V_target to the rotational speed V0. Furthermore, CPU 122 sets 8 as the variable i (step S31). As a result, the variable i indicates the (directed) rotational speed V8 (=target rotational speed V_target) at the deceleration start time. Hereinafter, the (directed) rotational speed at the deceleration start time indicated by the variable i is referred to as the (directed) rotational speed V(i). The (directed) rotational speed V(i) substantially coincides with the actual rotational speed of the motor 20. Also, the back electromotive force value for detection of step-out indicated by the variable i is referred to as the back electromotive force value Vol(i).

Next, CPU 122 determines whether the (directed) rotational speed V(i) at the deceleration start time of the rotation of the motor 20 has decelerated to the upper limit rotational speed V_Hi (=the rotational speed V5) (step S32). When the (directed) rotational speed V(i) is not equal to the upper limit rotational speed V_Hi (step S32→No), CPU 122 decelerates the motor 20 to a next (directed) rotational speed V(i−1) (step S33; a rotational speed changing step). When the variable i is equal to 8, the next (directed) rotational speed V(i−1) is equal to the (directed) rotational speed V7.

During deceleration of the rotation of the motor 20, CPU 122 serves as the step-out state detection unit to detect step-out based on the back electromotive force Vol(i−1) for detection of step-out (step S34). When the variable i is equal to 8, the back electromotive force value for detection of step-out indicated by the variable i is equal to Vol_7.

CPU 122 detects step-out based on the back electromotive force value Vol(i−1) for detection of step-out until the (actual) rotational speed of the motor 20 has decelerated to the next (directed) rotational speed V(i−1) (step S35→No) (step S34; a step-out state detecting step). When the (actual) rotational speed of the motor 20 has decelerated to the next (directed) rotational speed V(i−1) (step S35→Yes), CPU 122 subtracts 1 from the variable i (step S39). As a result, the (directed) rotational speed V(i) coincides with the actual rotational speed of the motor 20.

when the (directed) rotational speed V(i) has not decelerated to the (directed) rotational speed V0 (step S40→No), CPU 122 returns to the processing in step S32 and repeats the processing in steps S33 to S35 and S39 at three times. As a result, the value of the variable i is equal to 5.

When the value of the variable i is equal to 5 in step S32, the (directed) rotational speed V(i) is equal to the upper limit rotational speed V_Hi (step S32→Yes). At this time, the control unit decelerates the (directed) rotational speed of the motor 20 to the lower limit rotational speed V_Lo of the resonance region (step S36; a rotational speed changing step), and does not detect step-out during acceleration until the (directed) rotational speed of the motor 20 has decelerated to the lower limit rotational speed V_Lo (step S38→No; a resonance region determining step) (step S37).

When the rotational speed of the motor 20 has decelerated to the lower limit rotation speed V_Lo, CPU 122 proceeds to the processing of step S39 (step S38→Yes; a resonance region determining step).

Subsequently, the control unit repeats the processing of steps S33 to S35 and S39 four times to decelerate the rotation of the motor 20, and when the (directed) rotational speed has decelerated to V0 (step S40→Yes), the control unit terminates the processing of FIG. 10 because the rotational speed has reached the final directed rotational speed Vs.

<<Effect>>

According to the motor control device 10 of the present embodiment, it is possible to prevent erroneous detection of step-out in the resonance region under acceleration and/or deceleration of the rotation of the motor 20, and also detect step-out under acceleration and/or deceleration in regions other than the resonance region. Furthermore, the rotational speed of the motor 20 can reach the target rotational speed earlier as compared with usual acceleration and deceleration control.

(Variant)

The present disclosure is not limited to the above-described embodiment, but can be modified without departing from the subject matter of the present disclosure, and for example, the following variants (a) to (f) may be provided.
(a) The effect of the present disclosure can be achieved unless step-out determination is performed in the resonance region regardless of whether back electromotive force is measured.
(b) The rotational speed range in which step-out detection is not performed is not limited to the resonance region, and may include at least the resonance region.
(c) The range over which the rotational speed is promptly changed is not limited to the resonance region, and may include at least the resonance region.
(d) The rotational speed control method and the flowcharts are specific examples, and the present disclosure is not limited to the method and the flowcharts.
(e) The control values under acceleration and deceleration are provided in the form of table data, but may be calculated by mathematical expressions.
(f) The acceleration and deceleration curves are not necessarily linear (S-shaped curve and the like, and uniform acceleration is not necessarily required over the whole region).

What is claimed is:

1. A motor control device comprising:
a control unit for performing control so as to apply a pulse voltage modulated in pulse width to each of the coils of a plurality of phases equipped in a stepping motor and periodically switch phases of coil currents flowing through the coils of the plurality of phases;
a back electromotive force measuring unit for providing a stop period for temporarily stopping application of the pulse voltage to a coil of any one phase out of the coils of the plurality of phases when a direction of a coil current flowing through the coil of the phase switches and measuring back electromotive force induced in the coil during the stop period; and
a step-out state detecting unit for detecting a step-out state when a rotational speed of the stepping motor is not in a resonance region of the stepping motor and the back electromotive force measured by the back electromotive force measuring unit satisfies a predetermined step-out state determination criterion.

2. The motor control device according to claim 1, wherein the step-out state detecting unit does not perform a determination of a step-out state during acceleration and/or deceleration of the stepping motor and in the resonance region of the stepping motor.

3. The motor control device according to claim 1, wherein the resonance region of the stepping motor is a region where the back electromotive force has a value deviating from a proportional relationship with the rotational speed of the stepping motor.

4. The motor control device according to claim 1, wherein the control unit promptly changes the rotational speed of the stepping motor when the rotational speed of the stepping motor has reached the resonance region.

5. The motor control device according to claim 4, wherein the control unit promptly changes the rotational speed of the stepping motor so that the rotational speed is equal to a rotational speed that crosses the resonance region when the rotational speed of the stepping motor has reached the resonance region.

6. A step-out state detection method for a motor control device that includes a control unit for performing control so as to apply a pulse voltage modulated in pulse width to each of the coils of a plurality of phases equipped in a stepping motor and periodically switch phases of coil currents flowing through the coils of the plurality of phases, and detects a step-out state of the stepping motor based on back electromotive force induced in a coil of any one phase out of the coils of the plurality of phases, wherein includes:
a rotational speed changing step of changing the rotational speed of the stepping motor based on speed command information;
a resonance region determining step of determining whether the rotational speed of the stepping motor is in a resonance region of the stepping motor during the change of the rotational speed; and
a step-out state detecting step of detecting a step-out state when a rotational speed of the stepping motor is not in the resonance region and the back electromotive force satisfies a predetermined step-out state determination criterion.

* * * * *